June 24, 1969  R. MARTIN  3,452,214
DIGITAL WAVE FORM DIVISION FOR POWER CONTROL
Filed Oct. 16, 1967

INVENTOR.
RICKY MARTIN
BY
*Elliott & Pastoriza*
ATTORNEYS

United States Patent Office 3,452,214
Patented June 24, 1969

3,452,214
DIGITAL WAVE FORM DIVISION FOR POWER CONTROL
Ricky Martin, North Hollywood, Calif., assignor, by mesne assignments, to Harry Feick Co., Inc., a corporation of California
Filed Oct. 16, 1967, Ser. No. 675,385
Int. Cl. H02j 7/22
U.S. Cl. 307—96                 10 Claims

ABSTRACT OF THE DISCLOSURE

An electrical circuit is provided for controlling the power delivered to a load from a cyclic wave form such as a sine wave. A series of pulses of considerably higher frequency than the frequency of the sine wave is passed into a counter. Initiation of operation of the counter is effected in synchronism with a consistent phase angle of the sine wave and a control pulse is derived from the counter after a pre-selected number of pulses have been counted. This control pulse in turn operates a switch connected between the sine wave and load to thus pass a consistent fraction of the sine wave form to the load, the fraction being a function of the pre-selected number of pulses counted. The power delivered to the load may thus be varied by changing the pre-selected number of pulses counted by the counted.

---

This invention relates broadly to electrical control circuits and more particularly to a novel circuit enabling digital division of a wave form for controlling power delivered to a load.

While the circuit of this invention will have many applications, its preferred embodiment will be described in conjunction with the controlling of power or current delivered to the electrodes of a welding machine.

Most commercial electrically operated welding machines are automated to the extent that various operations carried on for given legnths of time successively follow one another all in accordance with a prearranged program. For example, one operation would be the application of a given current to the electrodes for a programmed length of time in order to effect an optimum weld. In this situation a swell as in others, there is involved the supplying of a given load with electrical power of a desired magnitude over a given period of time.

For purposes of setting forth in particular example of the preferred embodiment of the present invention, a controlling of the current supplied to welding electrodes will be described.

In supplying current to welding electrodes, once a particular programmed length of time has been selected for applying the welding current, it is extremely important that the particular current applied have a consistent value. The value or magnitude of this current, of course, can be controlled by simply varying the amplitude of the wave form representing the current. However, this control at best is only approximate and is generally of an analog nature such that repeatability of the precise same quantity of current materials cannot be achieved.

With the foregoing in mind, it is thus a primary object of the present invention to provide a novel power control system wherein a desired input power to a load, such as the electrodes of a welding machine, can be consistently selected over an extremely broad range of values and wherein the selecting of this particular value of power can readily be repeated with assurance that precisely the same value will be provided for subsequently welding operations.

Briefly, this object as well as other advantages and features of this invention, are realized by employing a digital type system for controlling the power delivered to the load. In this respect, the power is derived from a cyclic wave form such as a sine wave and the digital control functions to select a desired fraction of the cyclic wave form, from, for example, each cycle or half cycle of the wave form and apply this to the load. The value of this fraction, assuming other parameters to be constant, will, of course, determine the overall power delivered to the load.

In accordance with the preferred embodiment, there is provided a pulse generating means for generating a series of pulses of frequency constituting an integral multiple of the frequency of the cyclic wave form. A counting means in turn is connected to receive these pulses and suitable means are provided for initiating the counting of these pulses at a point in time defined by a consistent phase angle of the cyclic wave form. This phase angle may be defined by the zero cross-over points of the wave form or may constitute a consistent point in time spaced by a pre-selected phase angle measured from the cross-over points.

Any desired total count number may be pre-selected in the counting means such that a control pulse will be derived from the counting means when the counting of the pre-selected number of pulses has been completed. There is thus defined a time interval between the initiation of the counting means and the completion of the counting of the pre-selected number of pulses which time interval may be employed to control a switch means in a manner to pass a fraction of each cycle, half cycle, or cycles separated by a consistent number, of the wave form to the load, this fraction being a function of the number of pulses counted.

The power to the load may be very finely varied in digital increments by simply changing the pre-selected number of pulses to be counted.

A better understanding of the foregoing as well as further embodiments and features of this invention will be had by now referring to the accompanying drawings, in which.

Figure 1:
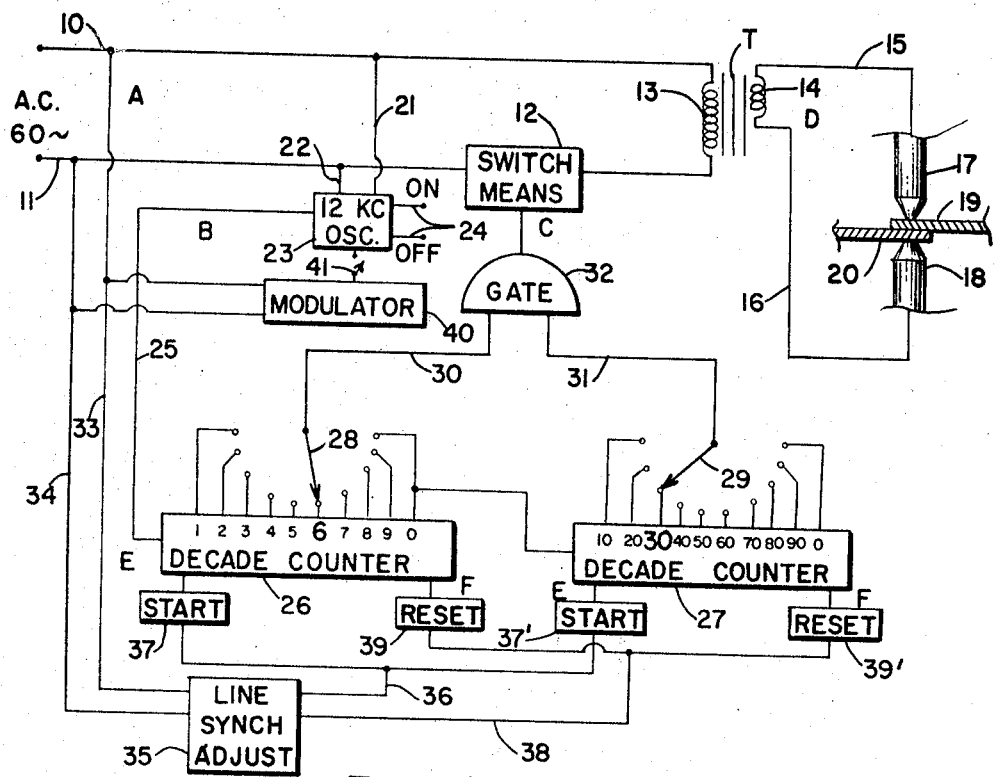
FIGURE 1 is a schematic circuit diagram partly in block form illustrating the control circuit of this invention.

Referring to FIGURE 1 there is shown, by way of example, conventional A.C. 60-cycle power lines 10 and 11 connecting through a switch means 12 to the primary 13 of a step down transformer T. The secondary 14 of this transformer connects through lines 15 and 16 to welding electrodes 17 and 18 positioned to weld together two overlapping members 19 and 20.

When the switch means 12 is closed, power from the A.C. 60-cycle source will be passed through the transformer to the welding electrodes and will effect a welding of the members 19 and 20. Thus, the power delivered to the electrodes 17 and 18 is derived from a cyclic wave form which, in the present example, constitutes a 60-cycle sine wave. The invention will hereafter be described in conjunction with a sine wave as providing power to the load in the form of the electrodes 17 and 18. It should be understood however, that the principles of the invention are applicable to any cyclic wave form.

In accordance with the invention, the power passed to the welding electrodes 17 and 18 of FIGURE 1 or any other equivalent load is controlled by the switch means 12. This switch means, as one example, may constitute silicon controlled rectifier means responsive to a control pulse to close or assume an "on" state for passing the wave form through the transformer to the load. This type of switch is designed to turn itself off automatically at the cross-over point of the sine wave; that is, when a polarity reversal takes place. In this case, it will be evident that the provision of a control pulse at a given point during the cycle described by the sine wave coupled with the fact that the switch automatically turns itself off at the cross-over point enables a desired fraction of the wave form to be passed to the load. By varying the point in time of the control pulse to the switch means to turn the same on relative to the phase of the sine wave form, this fraction may be varied from zero to the full value of the wave form and thus a very accurate degree of the actual power delivered to the load can be realized.

The accurate provision of a control pulse at a selected point in time during each cycle of the wave form to the switch means is achieved by a digital division of the sine wave form. In the embodiment of FIGURE 1, this division is accomplished by synchronizing through the branch leads 21 and 22 the generation of a series of pulses as by an oscillator 23. In the embodiment described, the frequency of these pulses is made to be an integral multiple of the 60-cycle sine wave frequency. In the specific example illustrated, this oscillator frequency is twelve kilocycles such that one hundred pulses will be delivered each half cycle of the sine wave. As will become clearer as the description proceeds, the control pulse to the switch means 12 to turn the switch means on or close the switch means is derived from the pulses generated by the oscillator 23.

Before describing further the circuit of FIGURE 1, it should be noted that the oscillator may be provided with on and off terminals 24 such that a programmed time period during which power is to be supplied to the electrodes 17 and 18 may be fed to the terminals 24 of the oscillator to turn the oscillator on at the beginning of the programmed time period and terminate its operation at the end of the programmed time period. The signal supplied to the on and off terminals 24 would be thus derived from another programming circuit in the welding machine. The present invention is not concerned with the other programming means referred to but only with the control of the amount of power delivered to the load during the programmed time period.

Returning now to FIGURE 1, the output from the oscillator 23 is connected through a line 25 to counting means in the form of series connected decade counters 26 and 27. The decade counter 26 includes ten output taps designated 1, 2, 3, 4, 5, 6, 7, 8, 9, and 0 respectively. As the series of pulses from the lead 25 are received in the decade counter 26, signals will successively appear on the various output taps such that, for example, after nine pulses have been received, there will appear a signal on the output tap 9. The tenth pulse in turn will result in a signal on the zero tap, the counter being of the ring type so that it will then start counting the next successive ten pulses. At the time that the decade counter 26 is recycled, that is, after the ninth pulse has been received, the next pulse on the zero output tap is passed to the decade counter 27. The counter 27 will thus count every tenth pulse as indicated by the output taps numbered ten through ninety. The decade counter 27 may also be a ring type counter such that it will again commence counting by tens after the one hundredth pulse has been received.

Suitable wiper arms 28 and 29 are provided for the respective counters 26 and 27 and these arms may be selectively set on any one of the various taps. As an example, the arm 28 is set on the tap six for the counter 26 and the arm 29 is set on the tap thirty for the counter 27. Leads 30 and 31 from the arms 28 and 29 pass to the input of a coincident gate 32. The gate 32 in turn provides a control pulse on its output passed to the switch means 12 only when signals are simultaneously present on the leads 30 and 31. Thus, a control pulse will occur from the gate only when the thirty-sixth pulse is received from the lead 25. This, of course, will be repeated on the one hundred and thirty-sixth pulse and thereafter, the resulting control pulses always being separated by one hundred pulses but their position with respect to the initiation of the counting being preselectable by the arms 28 and 29. In the embodiment illustrated, and as described heretofore, when a control pulse is passed from the gate 32 to the switch means 12, the switch means is turned on or closed.

The initiation of operation of the counting means in the scystem described thus far in FIGURE 1 occurs at the zero cross-over points of the sine wave and this initiation is consistent since the oscillator frequency is an integral multiple of the 60-cycle sine wave. It may be desirable, however, to employ a higher frequency which may not be an integral multiple of the sine wave, such higher frequency providing a finer division or control of the wave form. In this event, there is illustrated in FIGURE 1 a modification of the circuit wherein positive means are provided for initiating the counting operation and for resetting the counters for a subsequent initiation of the counting. Again, however, it is necessary to synchronize the initiation of the counting with the line frequency even though the frequency of the generated series of pulses may not be an integral multiple.

This synchronization is achieved by means of further branch lines 33 and 34 extending from the 60-cycle source input lines 10 and 11 to a line synchronization adjusting circuit 35. This circuit 35, which may incorporate an adjustable delay, function to generate respectively start and reset pulses consistently spaced at a desired phase angle from the cross-over points of the 60-cycle sine wave. The start pulse is received on lead 36 and passed to start pulse generators 37 and 37' to the decade counters 26 and 27 respectively. Similarly, the reset pulse is received on line 38 and passed to reset pulse generators 39 and 39' connected to reset the counters 26 and 27, respectively.

Finally, it may be desirable to time modulate the series of pulses from the oscillator 23 for purposes that will become clearer as the description proceeds. Towards this end, there is illustrated in FIGURE 1 a further modification wherein a modulator 40 is provided synchronized to the 60-cycle line by leads passing to the branch leads 33 and 34 as shown. This modulator 40 may be connected to the oscillator 23 by switch 41 when time modulation of the pulses is desired. In this respect, it is to be understood that the number of pulses over a given cycle of the input sine wave will remainn consistent but the actual spacing of the pulses during the interval of the cycle will be time modulated.

Figure 2:
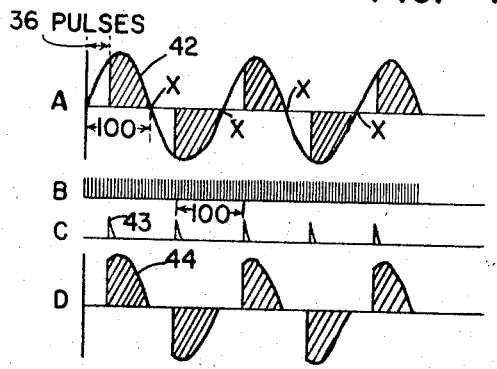
FIGURE 2 illustrates a series of wave forms existing at various correspondingly lettered points in the circuit of FIGURE 1.
Figure 3:
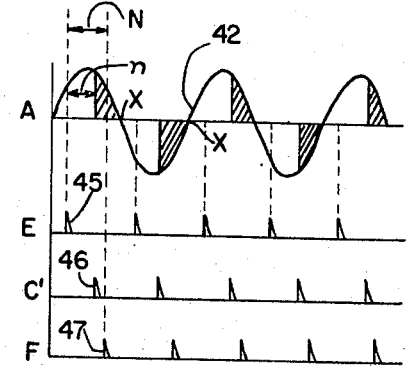
FIGURE 3 shows further wave forms existing at various points in the circuit of FIGURE 1 when operated in a modified manner; and, FIGURE 4 depicts enlarged wave forms useful in explaining a further modified operation of the circuit of FIGURE 1.
Figure 4:
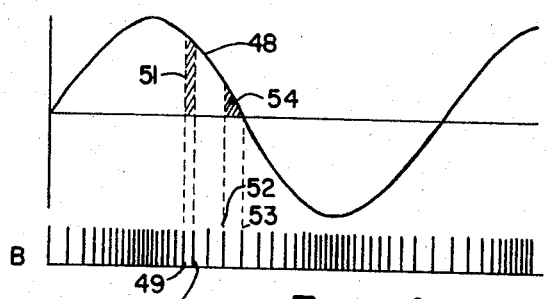

All of the foregoing will now become clearer by referring to FIGURES 2, 3, and 4.

With reference first to FIGURE 2 and considering first the embodiment of the circuit of FIGURE 1 without reference to the modifications described above, there is illustrated at 42 the input sine wave on the leads 10 and 11. This wave form is designated A in FIGURE 2 and will appear in FIGURE 1 at the position of the letter A.

The series of pulses provided by the oscillator 23 with the modulator disconnected is illustrated at B in FIGURE 2 and represents the output of the twelve kilocycle oscillator as similiarly lettered at B in FIGURE 1. Since the oscillator frequency is twelve kilocycles, it is evident that there will be provided one hundred pulses for each half cycle of the sine wave 42 as indicated in FIGURE 2.

Wave form C in FIGURE 2 indicates the control pulse from the gate 32 to the switch means 12 of FIG- URE 1. Thus, and as described heretofore, when the switch arms 28 and 29 of FIGURE 1 are positioned as illustrated, there will be provided a control pulse 43 after the first thirty-six pulses have been counted all as clearly illustrated in FIGURE 2. There will also be provided successive control pulses separated by one hundred pulses as indicated. It will be clear that these control pulses occur at a phase angle of the sine wave consistently spaced from the successive cross-over points designated X in the wave form A of the sine wave. Since the span of one hundred pulses covers 180° of the sine wave, the interval between successive pulses represents 1.8° of the phase angle of the wave.

As described, the switch means 12 will be closed upon reception of one of the control pulses C and will automatically open at the cross-over point X of the sine wave. Thus a fraction only of the wave form will be passed to the load and this fraction is indicated at wave form D and designated 44.

It will be immediately evident that the value of this fraction may be varied by varying the pre-selected number of pulses to be counted. Thus, with the setting as shown, the fraction of the wave form is sixty-four one-hundredths of a half cycle. The fraction thus constitutes a function of the number of pulses selected to be counted. If the arms 28 and 29 were set at, for example, ninety-eight by positioning the arm 28 on the tap eight and the arm 29 on the tap ninety, only two one-hundredths of half sine wave would be passed thereby providing a relatively small magnitude of power to the load.

FIGURE 3 illustrates a similar set of wave forms to those illustrated in FIGURE 2 wherein the positive start and reset pulse circuit described in FIGURE 1 is employed. In this instance, and as heretofore described, it is not necessary that the oscillator 23 have a frequency constituting an integral multiple of the 60-cycle sine wave. This frequency rather could be a value such as twenty kilocycles which would enable a finer division of the sine wave to be realized.

In FIGURE 3 there is reproduced at A the sine wave 42. The generated start pulses from the start circuits 37 and 37' to the counters 26 and 27 are illustrated at 45 in wave form E of FIGURE 3. These pulses are consistently generated at a given desired phase angle relative to the cross-over points of the sine wave 42 by adjustment of a suitable delay in the line synchronization circuit 35 of FIGURE 1.

Assume that the frequency of the oscillator is set at a value different from twelve kilocycles such that one hundred pulses are generated within the time interval designated N in FIGURE 3. The operation of the counters will be initiated by the pulse 45 at a given phase angle of the sine wave as illustrated in FIGURE 3. If the arms 28 and 29 are now set to count $n$ pulses where $n$ is less than N there will result the generation of a control pulse as indicated in the plot C' at 46 having a definite phase angle relationship to the sine wave. The control pulse 46 will then turn the switch means 12 on at a specific point and the switch again will automatically be turned off at the cross-over point X of the wave form. However, one hundred counts will have been completed before this cross-over point and the counters, unless a suitable control is provided, would commence counting again. It is for this reason that the reset pulse is provided by the reset pulse generating circuits 39 and 39' as described in FIGURE 1. This reset pulse is indicated at 47 and will occur at the end of the one hundred pulses at a point before the cross-over point of the sine wave. The counters are thus reset by the pulse 47 derived from the line synchronizing adjusting circuit 35 and will remain dormant until reception of the next start pulse shown in wave form E.

From the foregoing, it will be evident that there is no necessity of the oscillator frequency constituting an integral multiple of the sine wave frequency. Further, it will be evident that a finer division of a selected portion of the sine wave form can be realized.

Referring now to FIGURE 4, there is illustrated the embodiment of the invention wherein the modulator 40 of FIGURE 1 is utilized. Thus, when the switch 41 of the modulator is closed, the pulses generated by the oscillator 23 will be time modulated. With particular reference to FIGURE 4, there is illustrated at 48 in enlarged view the 60-cycle sine wave corresponding to the sine wave 42 of FIGURES 2 and 3. Another sine wave in exact phase to this sine wave is employed for modulating the pulses in the oscillator 23 in such a manner that the area of a portion of the sine wave 48 between any two successive pulses illustrated at B' in FIGURE 4 is equal to the area of any other portion of the sine wave between any other two successive pulses.

As a specific example, consider the two successive pulses 49 and 50 of FIGURE 4. The area of the portion of the sine wave 48 between these pulses is indicated at 51. Consider next another two successive pulses such as 52 and 53. The area of the portion of the sine wave 48 between these pulses is indicated at 54. The variation in the time interval between the respective successive pairs of pulses is such that the area 54 is made exactly equal to the area 51.

Thus, it will be evident that the actual power delivered to the load will vary linearly with a variation in the number of pulses selected to define the particular fraction of wave form passed to the load. The same result could be achieved by employing a square wave rather than a sine wave wherein the incremental areas of the square wave between successive pulses uniformly spaced in time would always be the same. However, in view of the convenience of providing a cyclic wave form in the form of a sine wave, it would be preferable to employ the modulator to derive the desired linear relationship as described.

From the foregoing description, it will be evident that the present invention has provided a unique control circuit wherein a digital control of the power supplied to a given load over a wide range and with a fine degree of accuracy can be realized. The particular examples set forth wherein the series of pulses generated constitutes twelve kilocycles and wherein only two decade counters are used should not be deemed as limiting but merely as illustrative of the principles of operation of the invention. Further, and as stated heretofore, while a sine wave has been described as the particular cyclic wave form involved, it will be evident to those skilled in the art that the principles of the invention are applicable to other types of cyclic wave forms.

The invention accordingly is not to be thought of as limited to the particular embodiments set forth for illustrative purposes only.

What is claimed is:

1. A method of controlling the power delivered to a load from a cyclic wave form, comprising the steps of: generating a series of pulses; initiating the counting of a pre-selected number of said pulses in synchronism with a consistent phase angle of said wave form; generating a control pulse in response to the completion of each counting to define a time interval between the initiating time of said counting and its completion; and actuating a switch means at a point in time determined by said time interval to cause a consistent fraction of said wave form to be passed to said load, said fraction being a function of said pre-selected number of said pulses counted, whereby the power delivered to said load may be varied by changing said pre-selected number of said pulses to be counted.

2. The method of claim 1, in which the frequency of said series of pulses is an integral multiple of the frequency of said cyclic wave form and in which said phase angle at which the counting of said pulses is initiated is defined at the zero cross-over points of said cyclic wave form, said switch means being responsive to said control pulse to close and being responsive to zero cross-over points of said wave form to open, whereby said fraction of said wave form passed to said load is defined between said control pulse and the succeeding zero crossover point of said wave form.

3. The method of claim 1, including the step of generating a starting pulse at said phase angle of said wave form, said phase angle being different from the phase angle defined at the zero cross-over points of said cyclic wave form, the initiation of said counting being responsive to said starting pulse.

4. The method of claim 3, including the step of generating a reset pulse at a point in time between the completion of said counting and the succeeding zero cross-over point of said cyclic wave form, said reset pulse inhibiting further counting of said series of pulses until the point in time at which a succeeding starting pulse is generated.

5. The method of claim 1, including the step of time modulating said series of pulses in accordance with the shape of said cyclic wave form such that the area of said wave form defined between any two successive pulses of said series of pulses is equal to the area defined between any other two successive pulses.

6. An apparatus for controlling the power delivered to a load from a cyclic wave form, comprising, in combination: pulse generating means for providing a series of pulses; counting means connected to said pulse generating means; means connected to said counting means for providing a control pulse upon completion of the counting of a pre-selected number of pulses; means responsive to said cyclic wave form for initiating operation of said counting means in synchronism with a consistent phase angle of said wave form whereby a time interval is defined between the initiation of operation of said counting means and the provision of said control pulse; and a switch means connected to pass power to said load from said cyclic wave form when closed and to terminate power to said load when opened, said switch means being connected to receive said control pulse to operate the same whereby said switch means is closed and opened at points in time to cause a consistent fraction of said wave form to pass to said load, said fraction being a function of said pre-selected number of pulses and being variable by changing said pre-selected number of pulses.

7. An apparatus according to claim 6, in which the frequency of pulses provided by said pulse generating means is an integral multiple of the frequency of said cyclic wave form, and in which said consistent phase angle at which operation of said counting means is initiated is defined at the zero cross-over points of said cyclic wave form, said switch means being responsive to said control pulse to close and responsive to zero cross-over points of said wave form to open, whereby said fraction of said wave form passed to said load is defined between said control pulse and the succeeding zero cross-over point of said wave form.

8. An apparatus according to claim 6, including synchronizing means responsive to said cyclic wave form for generating a starting pulse at said phase angle, said phase angle being different from the phase angle defined at the zero cross-over points of said cyclic wave form, the initiation of operation of said counting means being responsive to said starting pulse.

9. An apparatus according to claim 8, in which said synchronizing means additionally provides a reset pulse at a point in time between the completion of said counting and the succeeding zero cross-over point of said cyclic wave form, said counting means being responsive to said reset pulse to reset itself and remain dormant until a point in time at which a succeeding starting pulse is provided.

10. An apparatus according to claim 6, including time modulating means connected to said pulse generating means and responsive to said cyclic wave form for time modulating said series of pulses in accordance with the shape of said cyclic wave form such that the area of said wave form defined between any two successive pulses of said series of pulses is equal to the area defined between any other two successive pulses.

References Cited

UNITED STATES PATENTS

| 3,231,719 | 1/1966 | DeViney et al. | 219—501 X |
| 3,243,689 | 3/1966 | Perrins | 307—252 X |
| 3,251,000 | 5/1966 | Suel | 307—252 X |
| 3,365,654 | 1/1968 | Johnston | 219—501 X |
| 3,378,703 | 4/1968 | Huxster et al. | 307—226 X |

ROBERT K. SCHAEFER, *Primary Examiner.*

T. B. JOIKE, *Assistant Examiner.*

U.S. Cl. X.R.

219—497, 501; 307—133, 252; 323—22, 38